Fig. 3

Inventors
Richard M. Elliott
Edmund S. Lee III
By their Attorney

Fig.10  Fig.11  Fig.12  Fig.13

Inventors
Richard M. Elliott
Edmund S. Lee III
By their Attorney

May 1, 1956   R. M. ELLIOTT ET AL   2,743,924
CONTROL SYSTEM FOR WORKPIECE TREATING MACHINES
Filed Aug. 19, 1953   8 Sheets-Sheet 6

Inventors
Richard M. Elliott
Edmund S. Lee III
By their Attorney

Inventors
Richard M. Elliott
Edmund S. Lee III
By their Attorney

May 1, 1956  R. M. ELLIOTT ET AL  2,743,924
CONTROL SYSTEM FOR WORKPIECE TREATING MACHINES
Filed Aug. 19, 1953  8 Sheets-Sheet 8

*Fig. 20*

*Inventors*
Richard M. Elliott
Edmund S. Lee III
By their Attorney

United States Patent Office 2,743,924
Patented May 1, 1956

2,743,924

CONTROL SYSTEM FOR WORKPIECE TREATING MACHINES

Richard M. Elliott, Beverly, and Edmund S. Lee III, South Hamilton, Mass., assignors to United Shoe Machinery Corporation, Flemington, N. J., a corporation of New Jersey Application August 19, 1953, Serial No. 375,275

28 Claims. (Cl. 271—68)

This invention relates to control systems and to work treating machines having, in combination, automatic means for actuating the treating elements in timed relation to the passage of an intermediate portion of conveyed workpieces. More particularly the invention relates to a control system for computing the location of an intermediate portion of a workpiece to the machine through which it is passing and is herein illustrated as associated with an automatic leather stacking machine described in application for Letters Patent of the United States, Serial No. 251,014, filed October 12, 1951, now Patent No. 2,737,390, in the names of Paul E. Morgan, Arthur R. Abbott and John J. Maciejowski but it will be understood that the invention is not limited to machines of this particular type. This application is a continuation-in-part of application for Letters Patent of the United States, Serial No. 306,371, filed August 26, 1952, in the names of Elliott et al. (now abandoned).

In the operation of automatic work treating machinery it is, in some processes, essential that the treating means be operated intermittently, in some instances for the sake of economy such as in spray finishing of various articles and in other cases the nature of the treatment is inherently intermittent as in folding and stacking machines. In addition to the need for intermittent operation of the treating means (used broadly to include all types of operations e. g. stacking, spraying, unhairing etc.) it is often necessary to actuate these means in timed relation to an intermediate portion of a moving workpiece as in the stacking machine referred to. In many cases where the article treated is of regular size and shape it is sufficient to actuate the treating means in response to the passage of the leading edge of the article through the machine. In those cases the treating means, by simple expedients, may be actuated in timed relation to any intermediate portion of the article as its size and speed may be regarded as constants. However, where the sizes of the articles treated are nonuniform and may vary greatly from workpiece to workpiece as well as from lot to lot, these expedients no longer suffice.

In machines such as the automatic leather stacking machine herein described, several problems are presented for automatic operation, the primary problem being to initiate the operation of the stacking means when the midpoint of a workpiece reaches a certain point in the machine so that it will be properly draped upon workpiece receiving means. It must be possible to feed workpieces in very rapid succession so that little spacing exists between them. It must be possible to accommodate a great range of sizes of workpieces without making any adjustment in the control device. The range of size of leather workpieces varies, roughly from 1½ feet to 14 feet. Further, it must be possible to alter the timed relationship of the stacking means to the middle portion of the workpiece in a simple and efficient manner.

It is a general object of the present invention to provide an improved control system adapted for use with work treating machines for actuating work treating means in timed relationship to the passage of an intermediate portion of the workpiece through the machine.

An object of the present invention is to provide a control system adapted to handle a wide range of sizes without the necessity of manually adjusting the mechanism. A further object of this invention is to provide a control system which can actuate the treating means of a work treating machine with a minimum limitation as to the spacing between workpieces treated. An additional object of this invention is to provide means in a control device for varying the timed relation between the actuation of the treating means and the intermediate portion of a conveyed workpiece. A still further object of this invention is to provide automatic work treating machinery having control means adapted to actuate the treating means of such machines in predetermined time relationship to the passage of an intermediate portion of a workpiece through the machine.

More particularly, and in accordance with various features of the present invention, a control system is provided in association with an automatic leather stacking machine of the type disclosed in the aforementioned application Serial No. 251,014. In that type of machine workpieces are carried upwardly by conveyor belts along an inclined slope to an upper pivot roll and then downwardly along a swinging arm. The arm is oscillated in proper time relationship to the passage of the workpiece so as to drape the workpiece equally on either side of a work receiving member, generally designated as a horse. In this type of machine it is necessary that the arm be oscillated when the midpoint or middle portion of the workpiece has reached a point usually along the swinging arm and is conveniently referred to as point X.

The present invention is based on principles which are hereinafter explained in detail. Briefly they comprise the varying of a condition by two elements which are independently actuated by sensings of selective workpiece leading and trailing edge detector stations spaced apart on a conveyor of a machine, the rate of the element actuated by the trailing edge detector being proportional to that of the conveyed workpiece and in the same ratio thereto as a fixed amount of said condition is to the distance between the detector stations, whereby when the condition is varied by either or both elements to a predetermined value then a selected intermediate portion of the sensed workpiece is in a desired relation to the leading edge detector station.

The present invention is shown in a mechanical embodiment; however it is recognized that there are electro-electronic, hydraulic and other equivalents of the elements employed to carry out the invention as well as many alternative mechanical arrangements. In accordance with the requirements of a leather stacking machine the control system herein is primarily adapted for determining the midportions of conveyed workpieces, however, by simple expedients other intermediate portions can be determined.

In accordance with a feature of the present invention two detector stations are provided on the upward conveyor run of the stacking machine, the lower station being adapted selectively to sense the trailing edge of a workpiece and the upper station selectively to sense the leading edge of a workpiece. The novel arrangement of the individual detector stations is not claimed herein but is claimed in application for Letters Patent of the United States Serial No. 300,895, filed July 25, 1952, in the names of Richard M. Elliott et al. The control mechanism comprises two coaxial members constantly rotating at the same rate but in opposite directions, one a ratchet wheel; the other a pinwheel having a multiplicity of pins slidably mounted parallel to the axis of the wheel and on a common radius. Means are provided for engaging an arm or third member with the ratchet wheel under actuation of the upper station and means spaced arcuately away from these means are provided for displacing a pin into the path of travel of said third member. The arcuate distance between said means represents the condition to be varied. The rate of travel of said coaxial members is proportional to the rate of the conveyed workpiece in the same ratio as a fixed portion of the arcuate distance is to the distance between said stations. Therefore when the arcuate distance has been exhausted by the first displaced pin and the arm the midportion of any length workpiece (with certain limitations) has arrived at a definite position in relation to the upper detector station.

A switch attached to the arm is closed by the leading pin and arm oscillating means of the stacker are actuated in proper time relationship to the conveyed workpiece.

After the switch is closed continued motion of the pin disengages a pawl member on said arm allowing the arm to be returned to its starting position by spring means. The displaced pins are returned to their original position by cam surfaces on said pawl member by this rotational movement and by the return movement of the swinging arm. With this arrangement very short distances are permitted between workpieces, the only time element requirement as to spacing being that time necessary for the return of the swinging arm to its starting position before the leading edge of a subsequent workpiece reaches the upper detector station. This permits, when very short workpieces are being stacked, for two or more trailing edge indications to be established on the pinwheel before the leading edge indications must be transmitted to the swinging arm. This is a so called memory feature which is of great advantage in reducing the spacing requirements between workpieces by providing a control device which can register or compute more than one workpiece at a time. Means are provided for varying the distance between the arm engaging means and the pin displacing means whereby it is possible to determine other relationships of the midportion of the conveyed workpiece to the upper detector station.

The above and other features of the invention including various novel details of construction and combinations of parts will now be more particularly described by reference to the accompanying drawings and pointed out in the claims.

Figure 18:
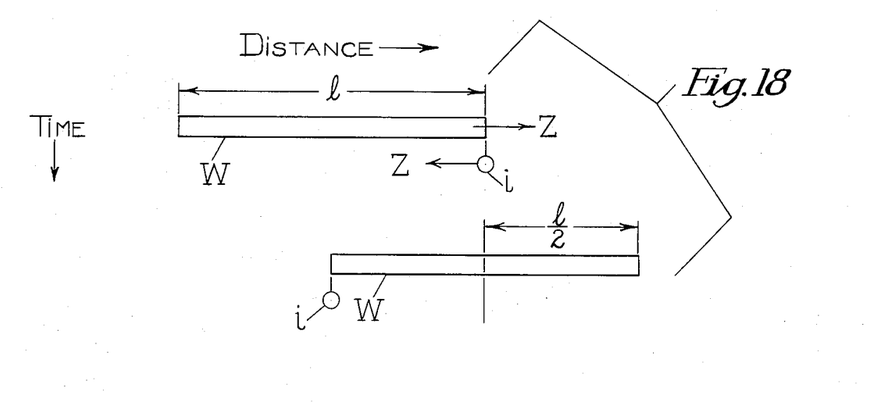
Fig. 18 is a schematic illustration of the principles of operation of the present invention.

In order fully to understand the present invention in its broader aspects it is necessary first to present a description of the principles of operation involved. The upper portion of Fig. 18 shows a workpiece W of length $l$ which is moving in the direction indicated by the arrow at rate Z. If, at the instant shown, an indicating element $i$ is set in motion in the opposite direction, also at rate Z, then when the workpiece W has traveled a distance ½, the element $i$ has also traveled a distance ½ and is immediately below the trailing edge of the workpiece at which time the midportion of the skin is at the starting point of the element $i$ as is shown in the lower part of Fig. 18. Without illustration it is obvious that if two elements were used, one to indicate the leading edge and the other to indicate the trailing edge, and they were set in motion at the point in time, shown in the upper portion of Fig. 18, and both travel at the rate Z in opposite directions, they will meet when the midportion reaches the starting point of the leading edge indicating element. It could be said that the starting points of the elements represent detector stations and, as will be shown more fully below, if there are two detector stations spaced apart and a workpiece passes beneath them, setting elements in motion as indicated above, when the elements meet, the midportion of the workpiece will be at the upper or forward detector station regardless of the length of the workpiece but with the limitation that the workpiece be no longer than twice the distance between the detector stations. Furthermore, if the leading edge indicating element is moved at a rate of speed Z/3 the two elements will meet when three quarters of the workpiece have passed beneath the upper detector station. By so varying the rate of speed of the leading edge indicating element the arrival of any intermediate portion of the workpiece at the upper detector station may be predetermined, although some limitations are placed on the maximum length of workpiece which may be detected.

Figure 19:
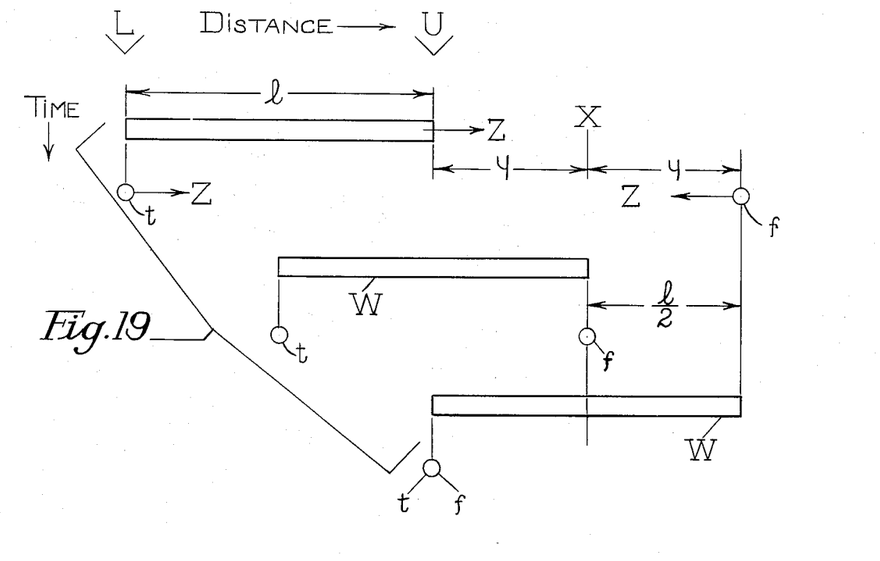
Fig. 19 is a schematic illustration of other principles of the present invention.

A further problem is presented where it is desired to determine the arrival of the midpoint of a workpiece at a point where it is impossible or impractical to locate a detector station. Referring to Fig. 19, a workpiece W of length $l$ is shown passing beneath detector stations L and U at rate Z. It is desired to know when the midpoint of the workpiece W arrives at point X; now, using an indicating element $t$ to indicate the trailing edge of the workpiece and element $f$ to indicate the leading edge of the workpiece it is seen that the starting point of the element $f$ has been moved a distance $2y$ or the distance from U to X plus a further distance which the element $f$ will travel in the time required for the leading edge of the workpiece to travel from U to X. The indicating elements $t$ and $f$ are set in motion again at a rate Z when the trailing and leading edges of the workpiece pass beneath the detector stations L and U respectively. When the workpiece has traveled a distance $y$ beyond the upper detector station the indicating element $f$ and the leading edge of the workpiece are both at point X while the trailing edge indicating element $t$ is even with the trailing edge of the workpiece as seen in the middle portion of Fig. 19. When the workpiece travels a further distance of ½ its midportion is at point X and at the same instant the elements $t$ and $f$ meet as is shown in the lower portion of Fig. 19. This likewise applies to workpieces whose length is other than the length $l$ and now instead of the maximum length of workpiece being the distance between the detector stations it becomes the distance between the lower detector station L and point X which makes these principles hold true for a longer length of skin where point X is beyond the station U. If it is desired to determine the arrival of some other intermediate portion at X the leading edge element is moved the distance $y$ plus the distance the element would travel during the time it takes the leading edge of the workpiece to pass from U to X. Furthermore, it should be appreciated that the same results may be obtained by decreasing the distance between the elements $t$ and $f$ in like manner thereby varying the point X in the opposite direction though with a consequent decrease in the maximum length of workpiece which may be handled with any one setup. By changing the point X the maximum length of workpiece that may be handled is also changed so that the distance between the lower or first station L and the point X is one of two factors controlling the maximum length of the workpiece, the other factor being the fractional portion of the length such as ½ or ¾ selected to arrive at the point X. With the distance between the first or lower station L and the point X expressed as D and with the selected fractional portion of the workpiece expressed as E, the length of the workpiece which may be handled can be no longer than $$\frac{D}{E}$$

The initial distance between the elements $t$ and $f$ is in effect a condition or quantity which is varied by the movement of these elements, the rate of variation caused by the trailing edge element $t$ being at all times proportional to the rate Z of the workpiece as a portion of the distance from $t$ to $f$ is to the distance between the stations L and U or in a one to one ratio as shown in Fig. 19.

Figure 20:
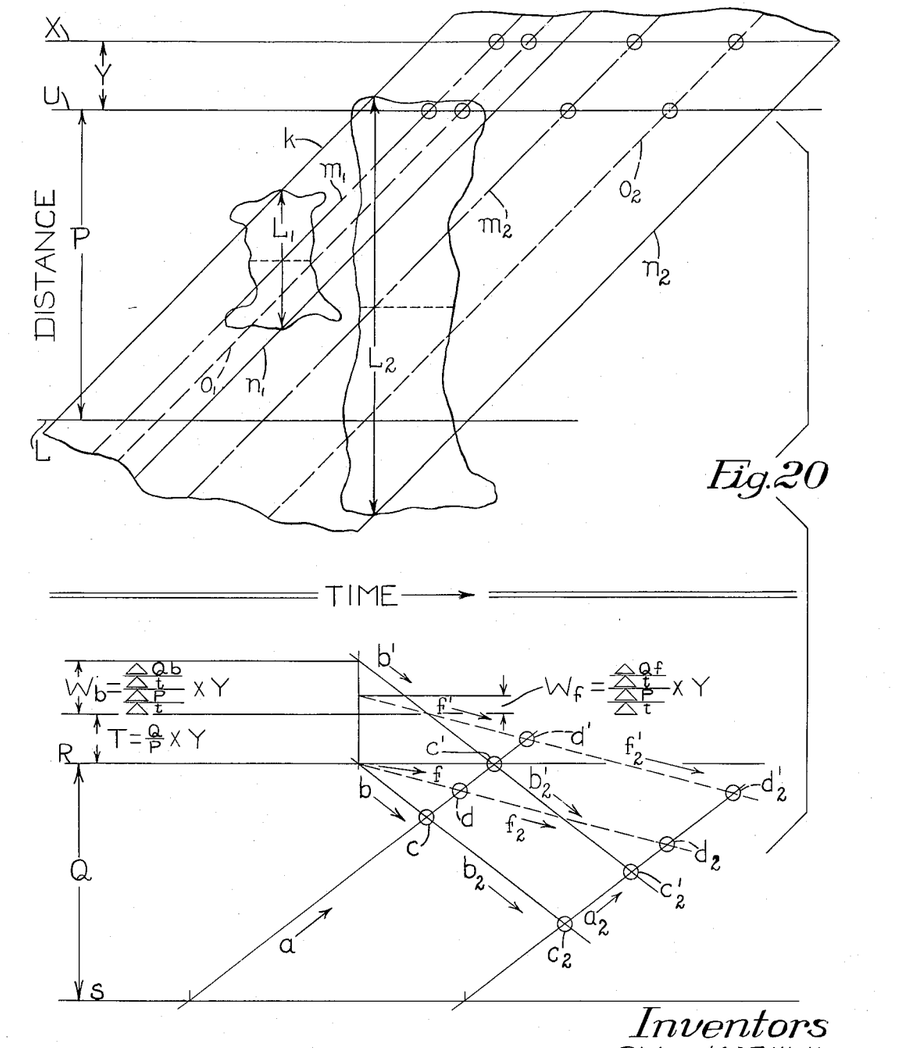
Fig. 20 is a time chart showing the correlation between the principles of the present invention and the movement of a workpiece through a machine.

In Fig. 20 two charts plotted on separate vertical scales but with a common "time" axis show these principles in a disassociated manner. On the upper scale the movement of two skins $L_1$ and $L_2$ is depicted with the progressive positions of their leading edges indicated by the common line $k$ and their midportions, three-quarter portions and trailing edges indicated by the lines $m_1$, $o_1$ and $n_1$ and $m_2$, $o_2$ and $n_2$ respectively. The upper and lower detector stations are indicated by the lines U and L while a point further along is indicated by the line X.

On the lower scale a condition or quantity Q is represented by two lines R and S. For determining the arrival of the midportion of $L_1$ at U the quantity Q is varied or reduced by an element starting from S following path $a$ at a rate proportional to the rate of $L_1$ and in the same ratio thereto as Q is to P. A second element starting from R is set in motion along path $b$ and at the same rate as path $a$. When these paths meet at $c$ the quantity has been varied a predetermined amount or exhausted and the midportion indicated by $m_1$ is at U. For determining other intermediate portions the rate of the leading edge element is varied, the element traveling along path $f$ and intersecting path $a$ at $d$ indicates the arrival of the three-quarter portion ($o_1$) at U.

Instead of exhausting the quantity Q, this quantity could be established by varying the condition in a positive manner and the paths $a$ and $b$ could be algebraically added to establish the same unit amount of variation.

Where it is desired to determine the arrival of an intermediate portion of $L_1$ at X the quantity or condition is varied by increasing it an amount T proportionately equal to the distance Y from U to X plus a further amount W equal to the amount of variation the leading edge element will cause in the time for the leading edge of $L_1$ to pass from U to X. For midportion determination this increased quantity will be varied by the trailing edge element traveling along path $a$ and by the leading edge element along path $b'$ and will be exhausted at $c'$ when $m_1$ reaches X. Similarly for three-quarters determination the increased quantity will be exhausted by elements following paths $a$ and $f'$ at $d'$ when $o_1$ is at X.

These principles hold for other lengths of workpieces. The second workpiece $L_2$ is shown by way of illustration with the paths of variation being shown on the lower portion of Fig. 20 and depicted by the same reference characters as for $L_1$ but with the subscript 2.

The principles of the present invention also hold true so long as there is a quantity or condition being varied by two elements at the time the leading edge of a workpiece arrives at where it is desired to determine the time relationship of some intermediate portion thereof so long as the rate of variation of the condition caused by one element is proportional to the rate of the conveyed workpiece in the same ratio as the quantity is to the length of the workpiece.

It is recognized that there are many means for carrying out the present invention in which these quantities could be represented by voltage, volume, etc. and the rate of change by volts or cubic units per minute. The invention for reasons of clarity will now be described in a mechanical embodiment.

Figures 1, 2:
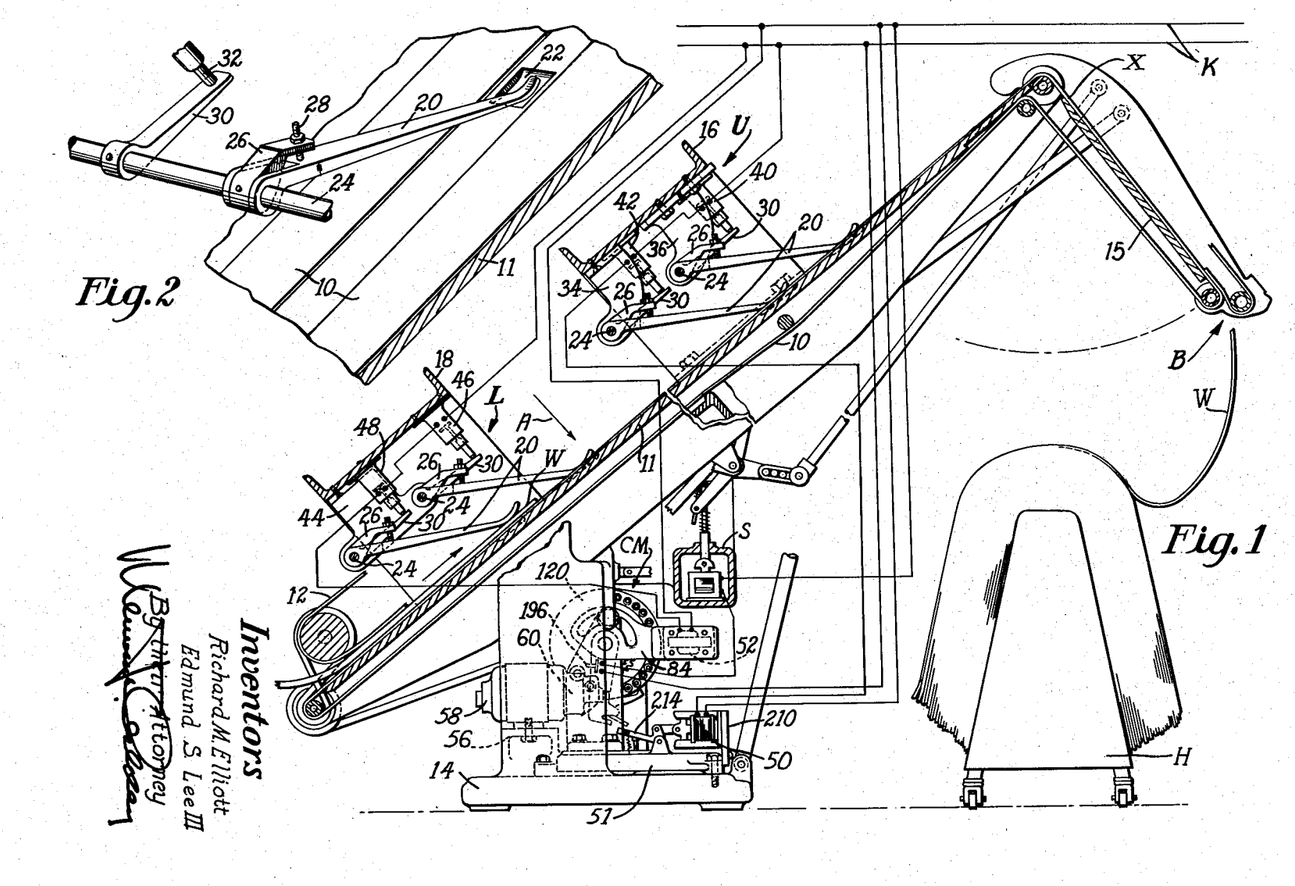
Fig. 1 is a view in side elevation and partly in section of a hide and skin stacking machine in which the present invention is embodied, a horse being shown in position to receive the work and a diagrammatic representation of the electrical circuits being superimposed in the interest of clarity.
Fig. 2 is an enlarged perspective view of detector structure such as shown in Fig. 1.
Figure 3:
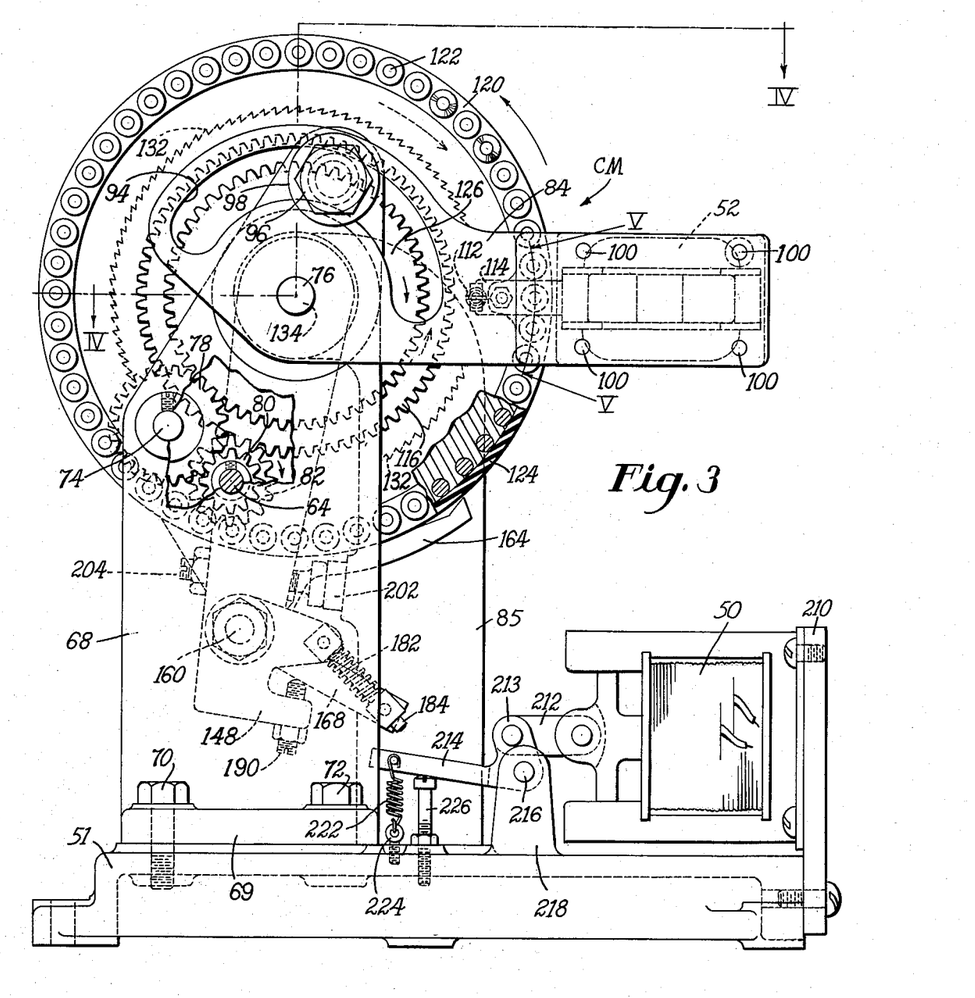
Fig. 3 is an enlarged elevational view, with some parts broken away, of a control mechanism shown in Fig. 1.

The stacking machine illustrated in Fig. 1 is similar to the machine disclosed in the above-mentioned application Serial No. 251,014. In such a machine multiplate endless work conveyor belts 10 are employed to convey consecutive workpieces up an inclined platform 11 and a depending work discharge arm 15 comprising a discharge portion B (Fig. 1) of the conveyor system is swung in an arc to deposit or drape hides or skins W on a horse H. Upper conveyor belts 12 are employed properly to confine the work and control its conveyance through the stacker. As in the patent application referred to, the swinging of the discharge portion B of the stacker is initiated for each workpiece W by a solenoid S which must be tripped at the proper time (when the center of a workpiece reaches a point on the conveyor system conveniently called "point X" (Fig. 1) for purposes of explanation) to deposit the center of each workpiece W over the center of the horse H to secure a balanced stack. The stacking machine is provided with a base 14 which serves as a support for the control mechanism CM (Figs. 1, 3 and 4) which mechanism represents one embodiment of a major portion of the present invention.

Figures 14, 15:
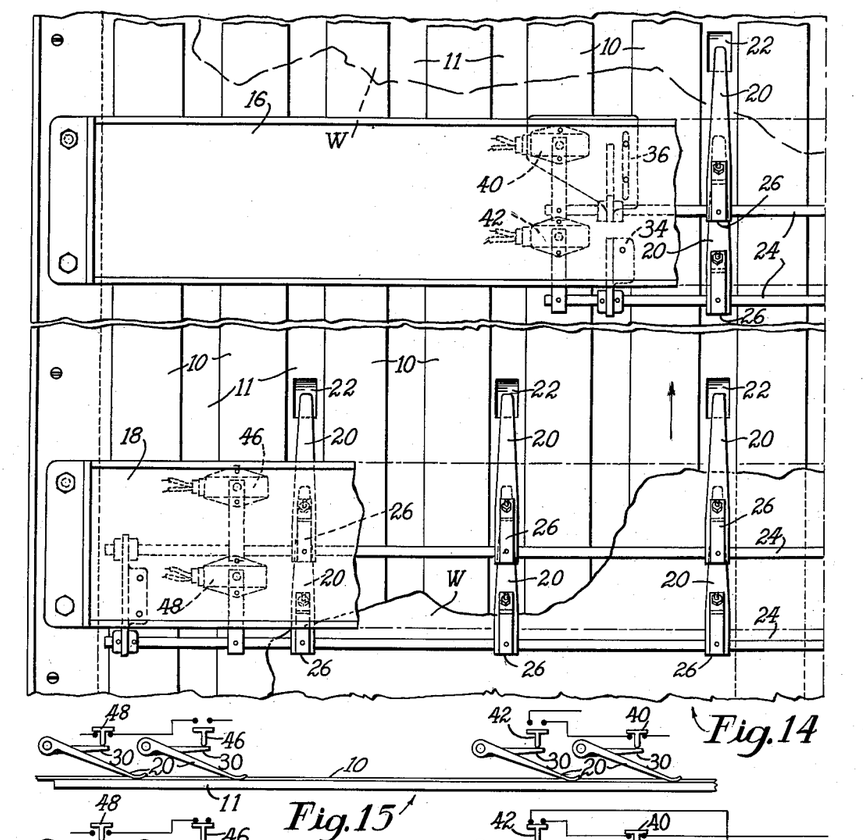
Fig. 14 is a view of a left-hand portion of the work conveyor, as viewed in the direction of the arrow A in Fig. 1.
Fig. 15 is a view similar to that of Fig. 7 but with the detector stations shown in their arrangement when no workpiece is present beneath them on the conveyor.
Figures 16, 17:
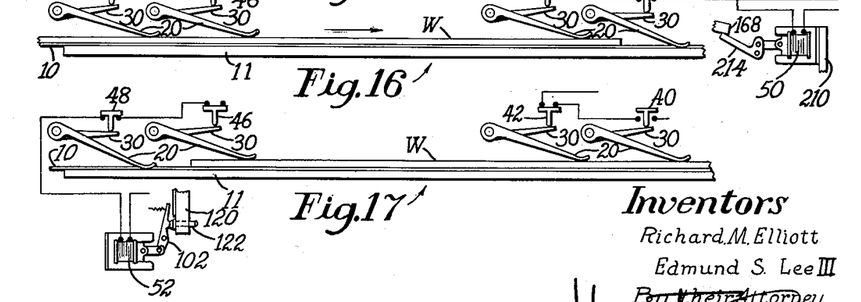
Fig. 16 is a view similar to Fig. 7 but with the leading edge of a long workpiece being detected.
Fig. 17 is a view similar to that of Fig. 8 but with the trailing edge of a long workpiece being detected.

In the present instance two channel bars 16 and 18 have been added and are placed transversely to the machine and over the conveyor belts 10, 12 as shown in Figs. 1 and 14. These channel bars are used to support selective detector stations for the leading and trailing edges of the workpieces W as the latter are consecutively conveyed on the belts 10.

Each station comprises several detector fingers 20. A representative finger is shown in Fig. 2 having a curved end adapted to extend in the absence of a workpiece W within a recess 22 of the platform portion 11 of the stacker. This platform portion 11 supports the work when the latter is guided between the belts 10 and 12. The upper end of the finger 20 is bifurcated and freely pivoted on a rod 24 to which is pinned an arm 26 having a stop screw 28 affixed thereto. Each of the four rods 24 utilized in the two detector stations is journaled in suitable brackets attached to either channel bar 16 or 18. Pinned to each rod 24 is a finger 30 which is arranged to operate the plunger 32 of one of four detector switches.

Three pairs of fingers 20 mounted on rods 24, as described above, and in the manner shown in Figs. 1 and 14, are employed selectively to detect the trailing edge of a workpiece thus comprising the lower detector station L. Three other pairs of fingers 20 are similarly mounted and supported beneath the channel bar 16 and comprise the leading edge detector station U. It will be noted that lifting of any one of the fingers 20 operating through the screw 28 and the arm 26 causes the plunger 32 to be moved or raised. This is of great importance in minimizing the downward force of the fingers 20 and thereby preventing the workpieces from becoming snarled or fouled on the fingers. The fingers are spaced transversely to the path of movement of the workpieces W more accurately to detect the foremost or rearmost portion as seen in Fig. 14.

The fingers 20 of the leading edge detector station U are supported on two of the rods 24 which are journaled in brackets 34 and 36 attached to the underside of the channel bar 16. Any or all three of the uppermost fingers 20 are arranged to operate a normally closed switch 40 and any or all three of the others are arranged to operate a normally open switch 42. The trailing edge detector station L is similarly arranged, the upper fingers 20 of that station operating the normally open switch 46 and the lower three fingers operating the normally closed switch 48.

Figures 6, 7, 8:
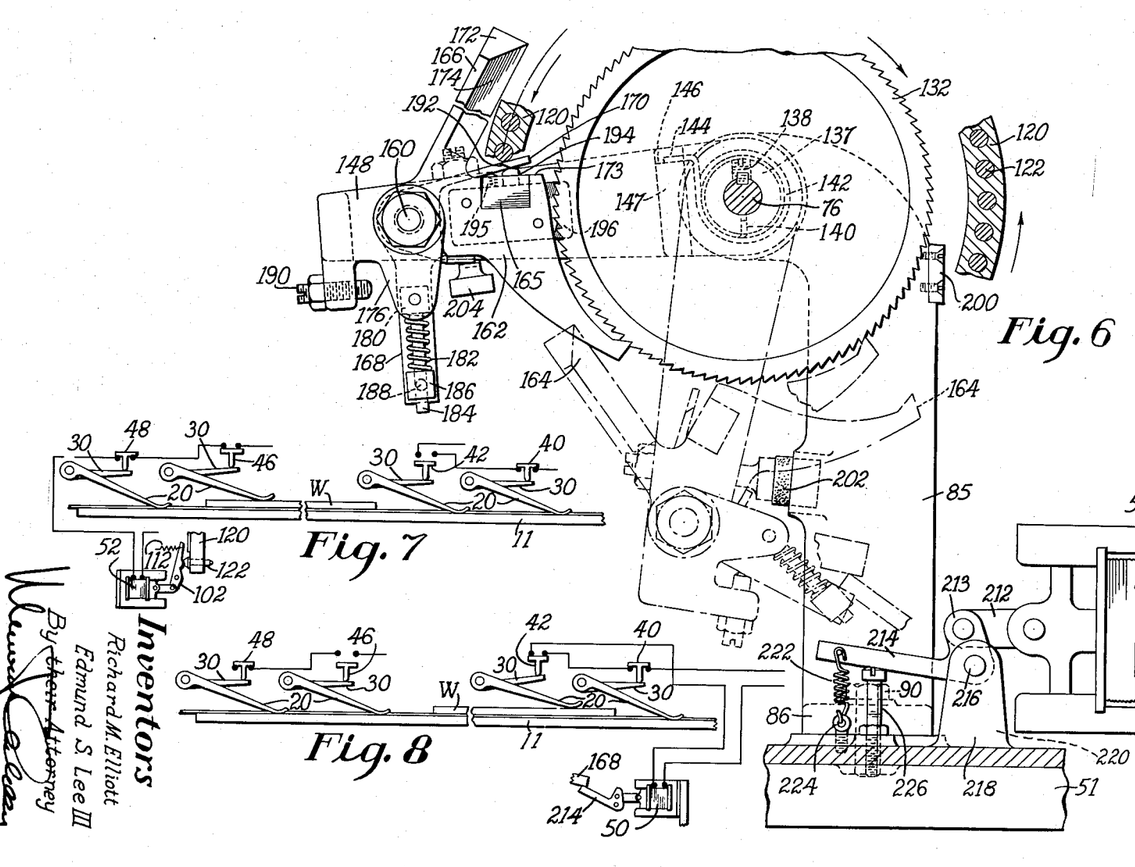
Fig. 6 is a sectional view along the line VI—VI of Fig. 4, some operative positions of the parts being shown in dot-and-dash lines.
Fig. 7 is a diagrammatic showing of the detector stations illustrated in Fig. 1, the lower detector station for the trailing edge only of a short skin being effective.
Fig. 8 is a view similar to that of Fig. 7, but with the upper detector station being operated with respect to the leading edge of a short skin.

The arrangement of the switches 40, 42, 46 and 48 permits the selective determination as to when leading and trailing edges of a workpiece pass beneath the two detector stations. Referring to Figs. 1, 7 and 8 it will be seen that when the leading edge of a workpiece is carried along by the belt 10 it first passes beneath one of the lowermost fingers 20 of the detector station L thereby opening the switch 48 before lifting one of the upper fingers 20 to close the switch 46. It is thus apparent that the passage of the leading edge of a workpiece could never complete a circuit in which the switches 46, 48 were incorporated. Continued movement of the workpiece W will next cause it to raise one of the lower fingers 20 of the detector station U thus closing the switch 42. It will be noted that the switch 40 is also closed so that current may flow through a circuit incorporating the switches 40, 42 for a short instant until the leading edge then raises one of the upper fingers 20 thereby opening the switch 40. In this manner it will be seen that a short impulse of current could pass the two switches 40, 42 giving an indication of the presence of the leading edge of a workpiece at the detector station U. Similarly when the trailing edge of the workpiece allows one of the lower fingers 20 of the detector station L to drop, the switch 48 is closed (Fig. 7) allowing a momentary completion of any circuit which might be flowing through the switches 46, 48, until the workpiece allows one of the upper fingers 20 to drop, opening the switch 46 so that again a momentary impulse of current gives an indication that the trailing edge of the workpiece is at the detector station L. No impulse of current is obtained when the trailing edge of the workpiece passes the detector station U as the raised lower finger 20 of that station drops off the skin first thereby opening the switch 42. The further functions of these detector stations will be described in connection with the control mechanism.

On the base 14 of the stacker is a raised cast portion 56 (Fig. 1) upon which is mounted an electric motor 58 to which is connected a gear casing 60 enclosing a speed reduction unit providing a continuous power drive for the control mechanism CM. A power output shaft 62 (Fig. 4) is connected to a shaft 64 of the control mechanism CM by a coupling 66. The shaft 64 is journaled in an upstanding bracket 68 (Figs. 3 and 4) a horizontal flange 69 of which is bolted by means of bolts 70, 72 to the base 51. Near and parallel to the shaft 64 are two other shafts 74 and 76. The shaft 74 is journaled in the bracket 68 and one end thereof has a gear 78 keyed thereto which is in mesh with a gear 80 on the shaft 64. The gear 80 is integral with a larger gear 82 and both are fixed to rotate with the shaft 64. One end portion of the shaft 76 is journaled in the bracket 68 and passes through and slightly outside of that bracket thereby providing a pivotal mounting for a solenoid bracket 84. The other end of the shaft is journaled in an upstanding portion 85 of a bracket 86 bolted at 90, 92 (Fig. 4) to the base 51. A solenoid 52 is mounted by its screws 100 to the bracket 84 which is adjustably secured about the shaft 76 by the bolt 96 which passes through an arcuate slot 94 (Fig. 3) formed therein and is threaded into the upper end of the bracket 68. A washer 98 is interposed between the head of the bolt 96 and the bracket 94. The plunger of the solenoid 52 is connected (Fig. 4) to the bifurcated end of a lever 102 by means of a link 104 and the lever 102 is pivoted at 105 between extensions 106 formed on the bracket 84. A lug 108 is formed on the extensions 106 and supports a pin 110 positioned to limit the motion of the lever 102. A spring 112 tends to hold the lever 102 against the pin 110. A cam surface 114 is formed on the lever 102 for purposes to be described below.

Figures 4, 5:
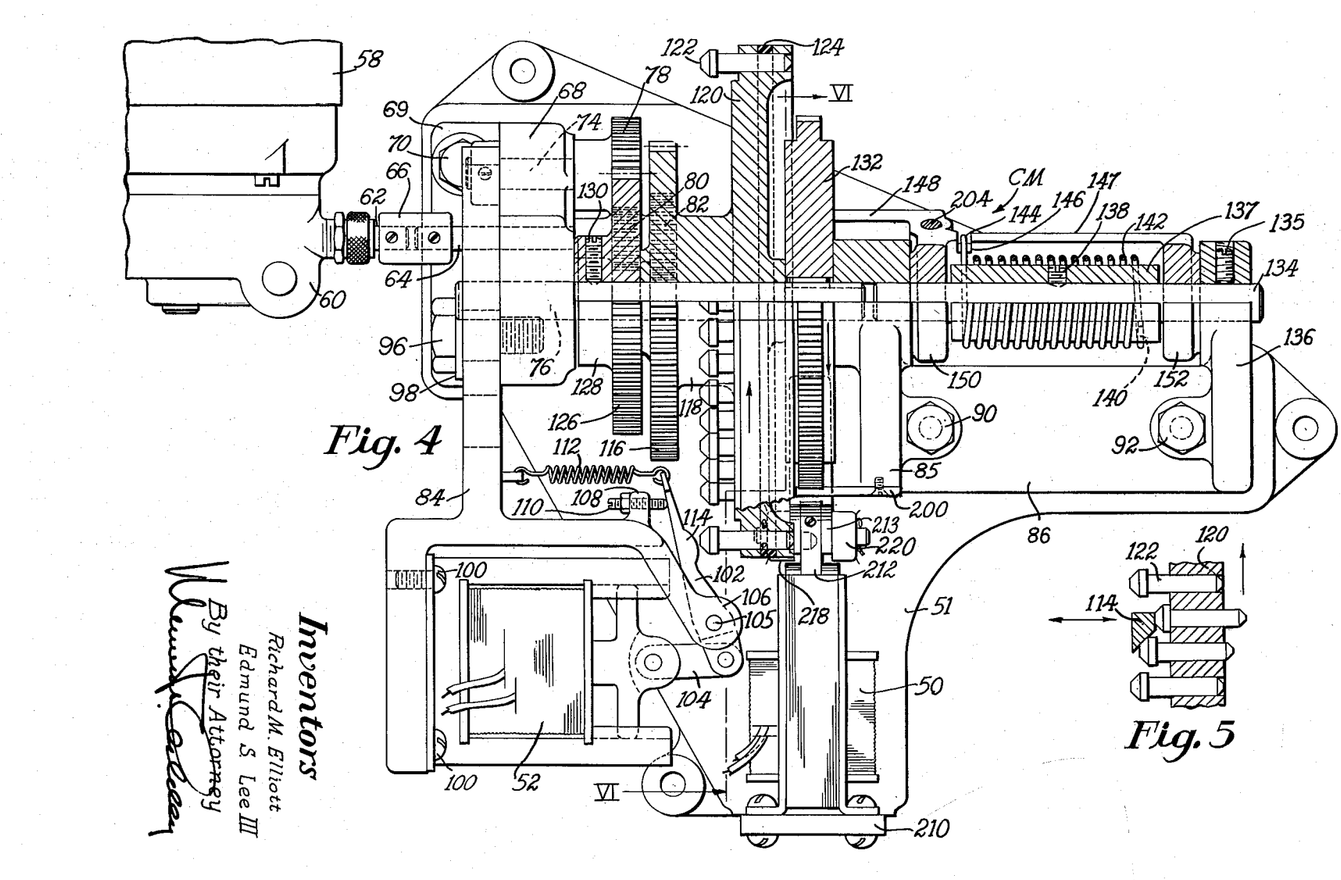
Fig. 4 is a plan and part sectional view taken along the line IV—IV of Fig. 3.
Fig. 5 is a projected sectional view taken along the line V—V of Fig. 3.

The gear 82 is in engagement with a gear 116 which has a common hub 118 with a pinwheel 120 mounted rotatably on and with respect to the shaft 76. Pins 122 are slidably mounted at spaced intervals about a radius of the pinwheel 120 and have their axes parallel to the shaft 76. Each pin 122 is provided with a tapered head and its opposite end is also tapered, as is shown in Fig. 5. An annular channel is formed on the periphery of the pinwheel 120 and an endless resilient rubber band 124 (Fig. 3) is so fixed in the channel that it exerts a frictional force against the pins 122. The gear 78 is in engagement with a gear 126. The hub 128 (Fig. 4) is fixed to the shaft 76 by a setscrew 130. Keyed to the shaft 76 and located between the pinwheel 120 and the bracket portion 85 is a toothed or ratchet wheel 132.

Coaxial with the shaft 76 is a shaft 134 one end of which is rigidly secured to a second vertical portion 136 of the bracket 86 by a setscrew 135 and the other end of which extends into the bore for the shaft 76 in the bracket portion 85. A hub 137 is secured to the shaft 134 by means of a setscrew 138. One end, 140, of a torsion spring 142 is recessed into the hub 137 and the other end 144 is bent outwardly (Fig. 6) to engage a slot 146 on a flat portion 147 of an arm 148. The latter has two hub portions 150, 152 (Fig. 4) which are freely rotatable on the shaft 134 and are joined by the flat portion 147.

The outer end of the arm 148 is U-shaped (Fig. 9) and carries a bolt 160 which serves as a pivot for a pawl member 162. The latter is provided with three arms 164, 166 and 168. L-shaped members 170 and 171 (Fig. 9) are integral with a hub 169 which is pivoted about the bolt 160 independently of the member 162. The arm 164 has formed at its extremity a pawl adapted to engage any one of the teeth of the ratchet wheel 132. The member 162 has formed thereon a camming surface 165 (Figs. 6 and 9) which is located in the arcuate path of travel of the pins 122. The arm 166 has two beveled camming surfaces 172 and 174 (Fig. 6) which are adapted at times to come within the path of any extended pins 122, as will further appear. An ear 176 (Figs. 1, 6 and 9) extends from the arm 148 to support a pivot block 180 in which is secured one end of a rod 184 the other end of which slidably passes through a second pivot block 186 pivotally mounted at 188 to the arm 168. A spring 182 exerts a pressure between the pivot blocks 180 and 186.

Figure 9:
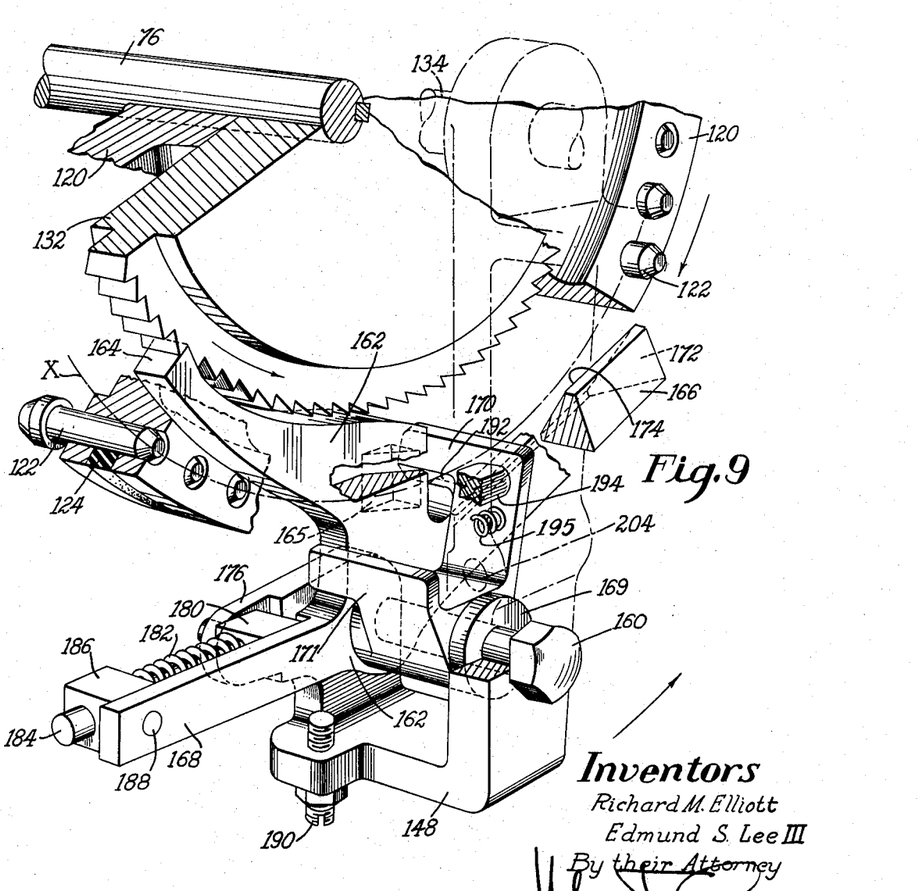
Fig. 9 is a perspective and more detailed view drawn to an enlarged scale of elements shown in Fig. 3, with portions broken away for ease of illustration.

A microswitch 196 (Figs. 1 and 6) is mounted on the side of the member 162 away from the pinwheel only the plunger 194 of which is shown in Fig. 9. The main body of the L-shaped arm 170 is adapted to engage the plunger 194 of this microswitch and a spring 195 (Figs. 6 and 9) is provided to permit opening of the switch. The arm 171 limits the rotative movement of the hub 169 with respect to the member 162 thereby maintaining the arm 170 in adjacent relationship with the plunger 194. At the end of the arm 148 an adjustable stop screw 190 is provided to engage the arm 168 thereby limiting the extent of the movement of the member 162 and to position correctly the cam surfaces 172 and 174 with the arcuate path of the pins 122. A block 200 (Figs. 4 and 6) is mounted on the upstanding portion 85 of the bracket 86 and is located in the arcuate path of the corner portion 173 of the pawl member 162. A resilient bumper 202 is also mounted in the upstanding portion 85 and is adapted to cooperate with an adjustable stop screw 204 mounted in the arm 148.

A vertical plate 210 is attached to the edge of the base 51 and supports a solenoid 50 the plunger of which is connected by a link 212 to the bifurcated end portion 213 of a lever 214. The latter is pivoted at 216 between two ears 218 and 220 integral with the base 51. The outer end of the lever 214 is resiliently connected to the base 51 by a tension spring 222 fastened to an eye bolt 224. A stop screw 226 adjustably limits the downward position of the lever 214. The free end of the lever 214 is arranged when under the activation of the solenoid to swing upwardly and strike the arm 168 (as is shown in Fig. 6).

The electrical circuit of the present machine is relatively simple and is composed of standard electrical components. Referring to Fig. 1 there are two main lines K. One circuit is adapted to flow from one line K through switches 46, 48 to activate the solenoid 52 and thence back to the other line K. A second circuit is arranged to flow from one line K through the switches 40, 42 to activate the solenoid 50 and thence back to the other line K. A third circuit is arranged to flow from one side of the line K through the switch 196 to activate the solenoid S and back to the other line K thereby initiating the hydraulic cycle which swings the arm 15 from side to side.

In accordance with the principles discussed at the beginning of this description there are two detector stations L and U spaced apart upon the conveyor. The lower station L selectively determines when the trailing edge of a skin passes beneath it. Upon such passage the circuit flowing through the switches 46, 48 is completed for a short instant thereby actuating the solenoid 52 causing the lever 102 to displace one or more of the pins 122 in the manner shown in Fig. 5. Because the movement of the lever 102 is not instantaneous, it may happen that possibly two to five pins may be displaced. The leading pin however is the one which is the trailing edge indicating element. The shape of the lever 102 is especially adapted to minimize the number of pins displaced and also to avoid the chance of a jam occurring due to the constant rotation of the pinwheel 120. The beveled surface thereof is sufficient to displace further pins 122 by a camming action.

The present device contemplates center finding determination and especially center finding determination of the time when the center of the workpiece passes beyond the upper detector station U. Therefore, the gear train formed by the gears 78, 80, 82, 116 and 126 is such as to cause the pinwheel 120 and the ratchet wheel 132 to be driven in opposite direction of rotation and at equal rates of speed, said rates to be discussed shortly.

A leading edge indicating element is established when the leading edge of a skin passes beneath the detector station U momentarily completing the circuit through the switches 40, 42 so that an impulse of current passes through the solenoid 50 which under this activation causes the lever 214 to be raised upwardly causing the extension 168 of the member 162 to rotate in a counterclockwise direction (Fig. 3) against the action of the spring 182 thereby causing the pawl member 164 to engage the ratchet wheel 132. In effect the switch 196 carried on the member 162 becomes the leading edge indicator element travelling in a direction of rotation opposite to that of the pinwheel 120.

The rates of the pins 122 and the switch 196 are established by manipulating the gear train referred to so that the rate is proportional to that of the conveyed workpiece W in the same ratio as a fixed portion of the arcuate distance between the starting points of the switch and pins is to the distance between L and U (the mechanism is shown with a greater displacement for determination of the midpoint at point X). The arcuate distance between the starting points of the pin and arm is the quantity or condition which is varied by exhausting it so that upon exhaustion (when the pin and the arm meet) the midportion of a sensed workpiece has a definite relationship with the upper detector station U. By altering the ratio of the gears 126 and 78 the rate of the arm 148 would be varied and the location of some other predetermined intermediate portion of the workpiece established.

As has been noted before, it makes no difference to the accuracy of this system whether a long or a short skin is passed through the machine and in point of time whether the solenoid 52 may punch a pin first or the solenoid 50 may be activated to set the swinging arm in motion by engaging the toothed member 164 with the ratchet wheel 132. In any case when the pin and swinging arm meet the midpoint of the skin will have reached its desired position.

The sequence of events occurring when the pin and the arm meet are more clearly shown in Figs. 10 through 13.

Figure 10:
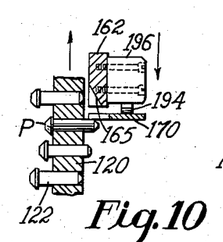
Fig. 10 is a section drawn to a reduced scale and in the plane including the dot-and-dash line X, as shown in Fig. 9.
Figure 11:
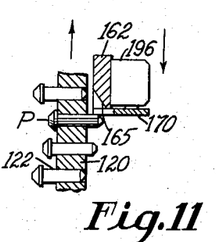
Figs. 11, 12 and 13 are views similar to Fig. 10 but with the parts as relatively located during different portions of the machine cycle.
Figure 12:
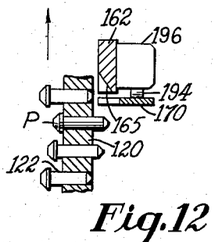
Figure 13:
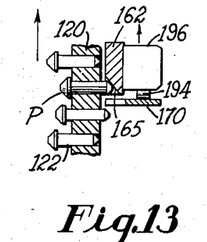

The relative movements and rates of the member 162 and the pinwheel 120 are indicated by the arrows. In Figs. 10 and 11 it will be noted that each element is travelling at the same rate of speed but in the opposite direction. Fig. 10 shows the pin P which indicates the trailing edge of the pin just making contact with the L-shaped member 170. A slight further motion causes the L-shaped member 170 to close the switch 196 (Fig. 11). At this meeting point the two indicating elements theoretically coincide and the midpoint of the skin has arrived at the desired point X location. Closing of the switch 196 completes the circuit flowing through the solenoid S which in turn actuates the hydraulic system causing the arm 15 to oscillate and place a workpiece W equally on either side of a horse H. Further relative movement between the members 120 and 148 causes the pin P to rotate the member 162 about the bolt 160 thereby disengaging the toothed member 164 from the ratchet wheel 132. It will be noted that when the toothed member 164 is in engagement with the ratchet wheel 132 the spring 182 (Fig. 9) exerts no turning moment upon the member 162. However once the member 162 is rotated by the pin P the spring 182 is removed from its on-center relationship so that it exerts a turning moment through the arm 168 causing the member 162 to rotate positively in a clockwise direction about the bolt 160 as seen in Fig. 6. Fig. 12 shows the position of the various elements just after this rotational motion has been caused by the spring 182. It will be noted that the pinwheel 120 continues to travel in the same direction and at the same rate of speed for that particular instant the member 162 and the arm 148 have no movement. At the instant the toothed member 164 is disengaged the torsion spring 142 tends to impart a counterclockwise rotation to the arm 148. However, as has been pointed out, the pinwheel 120 continues to move in the direction indicated and while the member 162 is either standing still or before it has attained a rate of speed equal to or greater than that of the pinwheel 120 from the spring 142 the pin P will pass over a beveled surface 192 (Fig. 6) formed on the L-shaped member 170 for clearance and will be cammed back to its original position by the surface 165 on the member 162 (Fig. 13). As was mentioned above, it is possible that two to five pins may be displaced by the solenoid 52. In order to erase these pins or return them to their original position the cam surface 174 is provided on the arm 166 of the member 162. When said member is rotated by the spring 182 upon disengagement from the ratchet wheel 132, the cam surface 174 is adapted to extend into the path of travel of the displaced pins and thereby erase them. The same surface may also erase pins where the arm 148 attains a rate of speed greater than the pin wheel 120; the surface 174 thereby overtakes any displaced pins not otherwise erased and returns them to their original position. The bumper 202 is disposed to engage the stop screw 204 and cushion the impact as the arm 148 is returned to its starting position (shown in phantom in Fig. 6) by the spring 142.

The cam surface 172 on the arm 166 is provided as a safety means. If, through inadvertence or accident, the circuit through the pin punching solenoid 52 is completed and pins 122 are displaced, the camming surface 172 when the arm 148 is in the phantom position shown in Fig. 6 is disposed in their path of travel and will automatically prevent such pins from causing the stacking machine to be cycled. A second safety means is provided by the lug 200 attached to the upright member 85. It is disposed in the path of travel of the member 162 and if by inadvertence the solenoid 50 is actuated and the member 162 rotated to engage the toothed member 164 the arm 148 will be rotated until the portion 173 of said arm engages the lug 200 thereby disengaging the toothed member 164, returning the arm 148 to its starting position again without causing a cycling of the machine through completion of the circuit through the switch 196 and the solenoid S.

In order to vary the location of point X the pin punching solenoid bracket 84 may be arcuately displaced about the shaft 76 through manipulation of the bolt 96. In this manner the distance between the leading and trailing edge indicator is varied. This feature is essential in that different types of leather and different sizes of leather behave differently so that the actuation of the swinging arm of the stacker must be varied to insure that the midpoint of the workpieces be placed centrally of the horse H.

It is essential that the spacing between workpieces introduced into the machine be held at a minimum and that very long skins also be accommodated. Through the use of the pin wheel it is possible for two or more skins to be computed at the same time by the present device; that is, a short skin may start up the conveyor belt 10 and the trailing edge will trip the pin punching solenoid 52 and the leading edge will then trip the swinging arm 148. A second skin may come along and the trailing edge of it also cause a pin 122 to be displaced. The only limitation between workpieces is that the midportion of the first skin must reach point X a sufficient time before the leading edge of the second workpiece arrives at the upper detector station so that the swinging arm 148 will have time to return to its starting position and be actuated again by the solenoid 50. Thus where the X point is only a short distance above the upper detection station U several, that is two to five, very short skins could actually have their trailing edge indicated on the pin wheel 120 and each skin be properly located on the horse H, that is to say, each skin would be within the computing mechanism at the same time.

Having thus described our invention, what we claim as new and desire to secure by Letters Patent of the United States is:

1. In a work treating machine having conveyor means, a control system comprising first and second detector stations spaced apart along said conveyor means, said stations being positioned so that a conveyed workpiece first passes by the first station, said first station including means for sensing only the passage of the trailing edge of the conveyed workpiece independently of said second station and said second station including means for sensing only the passage of the leading edge of the workpiece independently of said first station, and a control mechanism having first and second means for varying a condition at constant rates which are independently actuated in response to the sensings by the first and second detector stations respectively, the rate of variation caused by said first means being proportional to the rate of the conveyed workpiece and in the same ratio thereto as a fixed amount of said condition is to the distance between said stations, whereby when said condition has been varied to a predetermined value a selected intermediate portion of the workpiece has arrived at a predetermined point in relation to said machine.

2. In a work treating machine having conveyor means, a control system comprising first and second detector stations spaced apart along said conveyor means, said stations being positioned so that a conveyed workpiece first passes by the first station, said first station including means for sensing only the passage of the trailing edge of the conveyed workpiece independently of said second station and said second station including means for sensing only the passage of the leading edge of the workpiece independently of said first station, and a control mechanism having first and second means for varying a condition at constant rates which are independently actuated in response to the sensings by the lower and upper stations respectively, the rate of variation caused by said first means being proportional to the rate of the conveyed workpiece and in the same ratio thereto as a fixed amount of said condition is to the distance between said stations, and the rate of variation caused by said second means being the same as that of the first means whereby when said condition has been varied to a predetermined value the midportion of the workpiece has arrived at a predetermined point in relation to said machine.

3. In a work treating machine having conveyor means, a control system comprising first and second detector stations spaced apart along said conveyor means, said stations being positioned so that a conveyed workpiece first passes by the first station, said first station including means for sensing only the passage of the trailing edge of the conveyed workpiece independently of said second station and said second station including means for sensing only the passage of the leading edge of said workpiece independently of said first station, and a control mechanism having first and second means for varying a condition through a predetermined range at constant rates which are independently actuated in response to the sensing by the first and second detector stations respectively, the rate of variation caused by said first means being proportional to the rate of the conveyed workpiece and in the same ratio thereto as said range of variation is to the distance between said stations whereby when said condition has been varied through the predetermined range a selected intermediate portion of the workpiece has arrived at the second detector station.

4. In a work treating machine having conveyor means, a control system comprising first and second detector stations spaced apart along said conveyor means, said stations being positioned so that a conveyed workpiece first passes by the first station, said first station including means for sensing only the passage of the trailing edge of the conveyed workpiece independently of said second station and said second station including means for sensing only the passage of the leading edge of the workpiece independently of said first station, and a control mechanism having first and second means for varying a condition through a predetermined range at constant rates which are independently actuated in response to the sensings by the first and second detector stations respectively, the rate of variation caused by said first means being proportional to the rate of the conveyed workpiece and in the same ratio thereto as said range of variation is to the distance between said stations, the rate of variation caused by said second means being the same as said first means, whereby when said condition has been varied through the predetermined range the midportion of the workpiece has arrived at the second detector station.

5. In a work treating machine having conveyor means, a control system comprising first and second detector stations spaced apart along said conveyor means, said stations being positioned so that a conveyed workpiece first passes by the first station, said first station including means for sensing only the passage of the trailing edge of the conveyed workpiece independently of said second station and said second station including means for sensing only the passage of the leading edge of said workpiece independently of said first station, and a control mechanism having first and second elements arranged to be moved toward each other at constant rates which are independently actuated in response to the sensings by the first and second detector stations respectively, the rate of said first element being proportional to the rate of the conveyed workpiece and in the same ratio thereto as a fixed distance is to the distance between said stations, whereby when the distance between said elements has been exhausted by either or both elements a selected intermediate portion of the workpiece has arrived at a predetermined point in relation to said machine.

6. In a work treating machine having conveyor means, a control system comprising first and second detector stations spaced apart along said conveyor means, said stations being positioned so that a conveyed workpiece first passes by the first station, said first station including means for sensing only the passage of the trailing edge of the conveyed workpiece independently of said second station and said second station including means for sensing only the passage of the leading edge of the workpiece independently of said first station, and a control mechanism having first and second elements arranged to be moved toward each other at constant rates which are independently actuated in response to the sensings by the first and second detector stations respectively, the rate of said first element being proportional to the rate of the conveyed workpiece and in the same ratio thereto as a fixed distance is to the distance between said stations, the rate of said second element being the same as that of said first element, whereby when the distance between said elements has been exhausted by either or both elements the midportion of the workpiece has arrived at a predetermined point in relation to said machine.

7. In a work treating machine having conveyor means, a control system comprising first and second detector stations spaced apart along said conveyor means, said stations being positioned so that a conveyed workpiece first passes by the first station, said first station including means for sensing only the passage of the trailing edge of the conveyed workpiece independently of said second station and said second station including means for sensing only the passage of the leading edge of the workpiece independently of said first station, and a control mechanism having first and second means for varying a condition at constant rates which are independently actuated in response to the sensings by the first and second stations respectively, the rate of variation caused by said first means being proportional to the rate of the conveyed workpiece and in the same ratio thereto as a fixed amount of said condition is to the distance between said stations, and adjustable means for altering the value of said condition whereby when said condition has been varied by either or both means to a predetermined value a selected intermediate portion of the workpiece has arrived at a predetermined point in relation to said machine.

8. In a work treating machine having conveyor means, a control system comprising first and second detector stations spaced apart along said conveyor means, said stations being positioned so that a conveyed workpiece first passes by the first station, said first station including means for sensing only the passage of the trailing edge of the conveyed workpiece independently of said second station and said second station including means for sensing only the passage of the leading edge of said workpiece independently of said first station, and a control mechanism having first and second elements arranged to be moved toward each other at constant rates which are independently actuated in response to the sensings by the first and second detector stations respectively, the rate of said first element being proportional to the rate of the conveyed workpiece and in the same ratio thereto as a fixed distance is to the distance between said stations, and means for adjusting the distance between said elements whereby when said adjusted distance has been exhausted by either or both elements a selected intermediate portion of the workpiece has arrived at a predetermined point in relation to said machine.

9. In a work treating machine having conveyor means, a control system comprising first and second detector stations spaced apart along said conveyor means, said stations being positioned so that a conveyed workpiece first passes by the first station, said first station including means for sensing only the passage of the trailing edge of the conveyed workpiece independently of said second station and said second station including means for sensing only the passage of the leading edge of said workpiece independently of said first station, and a control mechanism having first and second elements arranged to be moved toward each other at constant rates which are independently actuated by the sensing by the first and second detector stations respectively, the rate of said first element being proportional to the rate of the conveyed workpiece and in the same ratio thereto as a fixed distance is to the distance between said stations, the rate of said second element toward said first element being the same as the rate of said first element, and means for adjusting the distance between said elements whereby when the adjusted distance between the elements has been exhausted by either or both elements the midportion of the workpiece has arrived at a predetermined point in relation to said machine.

10. In a work treating machine having conveyor means, a control system comprising first and second detector stations spaced apart along said conveyor means, said stations being positioned so that a conveyed workpiece first passes by the first station, said first station including means for sensing only the passage of the trailing edge of the conveyed workpiece independently of said second station and said second station including means for sensing only the passage of the leading edge of the workpiece independently of said first station, and a control mechanism having two members moving in opposite directions at constant rates, one of said members having a multiplicity of displaceable elements, an indicating element which may be intermittently attached to the other of said elements, means operable in response to the sensing by one of said stations for attaching said indicating element to said other member, means spaced apart from said attaching means which are operable in response to the sensing by the other of said stations for causing at least one of said displaceable elements to be disposed in a path interfering with that of said indicating element and moving theretowards, the rate of one of said members being proportional to the rate of the conveyed workpiece and in the same ratio thereto as a fixed distance is to the distance between said stations whereby when the distance between the two actuating means is exhausted by the displaceable element meeting the indicating element a selected intermediate portion of the workpiece has arrived at a predetermined point in relation to said machine.

11. In a work treating machine having conveyor means, a control system comprising first and second detector stations spaced apart along said conveyor means, said stations being positioned so that a conveyed workpiece first passes by the first station, said first station including means for sensing only the passage of the trailing edge of the conveyed workpiece independently of said second station and said second station including means for sensing only the passage of the leading edge of said workpiece independently of said first station, and a control mechanism comprising first and second coaxial members rotating in opposite directions, a multiplicity of pins annularly arranged in the first rotating member in displaceable relation thereto, a third member arranged to be intermittently connected with the second rotating member, means operable in response to the sensing by the second detector station for causing said third member to be so connected and driven by said second rotating member, means arcuately displaced from said connecting means and operable in response to the sensing by the first detector station for displacing one or more pins in said first member into the path of travel of said third member, the rate of said first member being proportional to the rate of the conveyed workpiece and in the same ratio thereto as a fixed arcuate distance is to the distance between said detector stations, whereby when the first of said displaced pins meets said third member a selected intermediate portion of the workpiece is at a predetermined point in relation to the machine.

12. In a work treating machine having conveyor means, a control system comprising first and second detector stations spaced apart along said conveyor means, said stations being positioned so that a conveyed workpiece first passes by the first station, said first station including means for sensing only the passage of the trailing edge of the conveyed workpiece independently of said second station and said second station including means for sensing only the passage of the leading edge of said workpiece independently of said first station, and a control mechanism comprising first and second coaxial members rotating in opposite directions but at the same rate of speed, a multiplicity of pins annularly arranged in the first rotating member in displaceable relation thereto, a third member arranged to be intermittently connected with the second rotating member, means operable in response to the sensing by the second detector station for causing said third member to be so connected and driven by said second rotating member, means arcuately displaced from said connecting means and operable in response to the sensing by the first detector station for displacing one or more pins in said first member into the path of travel of said third member, the rate of each of said members being proportional to the rate of the conveyed workpiece and in the same ratio thereto as a fixed arcuate distance is to the distance between said detector stations, whereby when the first of said pins meets the third member the midportion of the workpiece is at a point in fixed relation to the machine.

13. In a work treating machine having conveyor means, a control system comprising first and second detector stations spaced apart along said conveyor means, said stations being positioned so that a conveyed workpiece first passes by the first station, said first station including means for sensing only the passage of the trailing edge of the conveyed workpiece independently of said second station and said second station including means for sensing only the passage of the leading edge of said workpiece independently of said first station, and a control mechanism comprising two coaxial members rotating in opposite directions at constant rates of speed, a multiplicity of pins annularly arranged in the first rotating member in displaceable relation thereto, a third coaxial member arranged to be intermittently connected with the second rotating member, means operable in response to the sensing by said second detector station for causing said third member to be so connected and driven by said second rotating member, means arcuately displaced from said connected means and operable in response to the sensing by the first detector station for displacing one or more pins in said first rotating member into the path of travel of said third member, and means for varying the arcuate displacement between said connecting means and displacing means, the rate of said first member being proportional to the rate of the conveyed workpiece and in the same ratio thereto as a fixed arcuate distance is to the distance between said detector stations whereby when the first of said pins and said third member meet a selected intermediate portion of the workpiece is in a predetermined relation to the machine.

14. In a work treating machine having conveyor means, a control system comprising first and second detector stations spaced apart along said conveyor means, said stations being positioned so that a conveyed workpiece first passes by the first station, said first station including means for sensing only the passage of the trailing edge of the conveyed workpiece independently of said second station and said second station including means for sensing only the passage of the leading edge of the workpiece independently of said first station, and a control mechanism comprising two coaxial members rotating in opposite directions at constant rates of speed, a multiplicity of pins annularly arranged in the first rotating member in displaceable relation thereto, a third coaxial member arranged to be intermittently connected with the second rotating member, means operable in response to the sensing by said second detector station for causing said third member to be so connected and driven by said second rotating member, means arcuately displaced from said connected means and operable in response to the sensing by the first detector station for displacing one or more pins in said first rotating member into the path of travel of said third member, the rate of said first member being proportional to the rate of the conveyed workpiece and in the same ratio thereto as a fixed arcuate distance is to the distance between said detector stations whereby when the first of said pins and said third member meet a selected intermediate portion of the workpiece is in a predetermined relation to the machine and yieldable means operable in response to engagement of the third coaxial member and a displaced pin for disengaging said third member from said second member and returning it to its start position.

15. In a work treating machine having conveyor means, a control system comprising first and second detector stations spaced apart along said conveyor means, said stations being positioned so that a conveyed workpiece first passes by the first station, said first station including means for sensing only the passage of the trailing edge of the conveyed workpiece independently of said second station and said second station including means for sensing only the passage of the leading edge of the workpiece, and a control mechanism comprising two coaxial members rotating in opposite directions at constant rates of speed, a multiplicity of pins annularly arranged in the first rotating member in displaceable relation thereto, a third coaxial member arranged to be intermittently connected with the second rotating member, means operable in response to the sensing by said second detector station for causing said third member to be so connected and driven by said second rotating member, means arcuately displaced from said connected means and operable in response to the sensing by the first detector station for displacing one or more pins in said first rotating member into the path of travel of said third member, the rate of said first member being proportional to the rate of the conveyed workpiece and in the same ratio thereto as a fixed arcuate distance is to the distance between said detector stations whereby when the first of said pins and said third member meet a selected intermediate portion of the workpiece is in a predetermined relation to the machine, yieldable means operable in response to engagement of the third coaxial member and a displaced pin for disengaging said third member from said second member and returning it to its start position, and camming means integral with said third member which are arranged to erase or return said displaced pins to their original position during the disengaging motion or during the returning motion of the third member whereby said third member can again be set in motion prior to the time said displaced pin would have reached the starting point of said third member thereby permitting more than one sensing of a trailing edge by the lower station to be represented by displaced pins at the same time.

16. In a work treating machine having work treating means and conveyor means, a control system comprising first and second detector stations spaced apart along said conveyor, said stations being positioned so that a conveyed workpiece first passes by the first station, said first station including means for sensing only the passage of the trailing edge of the conveyed workpiece independently of said second station and said second station including means for sensing only the passage of the leading edge of said workpiece independently of said first station, and a control mechanism having first and second means for varying a condition at constant rates which are independently actuated in response to the sensings by the first and second detector stations respectively, the rate of variation caused by said first means being proportional to the rate of the conveyed workpiece and in the same ratio thereto as a fixed amount of said condition is to the distance between said stations, and means operable in response to the varying of said condition to a predetermined value for actuating the work treating means whereby said work treating means are actuated in timed relation to the passage of a selected intermediate portion of the workpiece in relation to said machine.

17. In a work treating machine having work treating means and conveyor means, a control system comprising first and second detector stations spaced apart along said conveyor means, said stations being positioned so that a conveyed workpiece first passes by the first station, said first station including means for sensing only the passage of the trailing edge of a conveyed workpiece independently of said second station and said second station including means for sensing only the passage of the leading edge of said workpiece independently of said first station, and a control mechanism having two members moving in opposite directions at constant rates, one of said members having a multiplicity of displaceable elements, an indicating element which may be intermittently attached to the other of said members, means operable in response to the sensing by one of said stations for attaching said indicating element to said other element, means operable in response to the sensing by the other of said stations for causing one of said displaceable elements to be located in a path interfering with that of said indicating element and moving theretowards, the rate of said elements being proportional to the rate of the conveyed workpiece and in the same ratio thereto as a fixed distance is to the distance between said stations whereby at the time the distance between the two actuating means is exhausted by the displaceable element and the indicating element meeting a selected intermediate portion of the workpiece has arrived at a predetermined point in relation to said machine, and means operable in response to the meeting of said indicating element and said displaceable element for actuating the work treating means in proper time relationship to the passage of a selected intermediate portion of the conveyed workpiece.

18. In a work treating machine having work treating means and conveyor means, a control system comprising first and second detector stations spaced along said conveyor means, said stations being positioned so that a conveyed workpiece first passes by the first station, said first station including means for sensing only the passage of the trailing edge of the conveyed workpiece independently of said second station and said second station including means for sensing only the passage of the leading edge of said workpiece independently of said first station, and a control mechanism comprising two coaxial members rotating in opposite directions but at the same rate of speed, a multiplicity of pins annularly arranged in the first rotating member in displaceable relation thereto, a third member arranged to be intermittently connected with the second rotating member, means operable in response to the sensing by the second detector station for causing said third member to be so connected and driven by said second rotating member, means arcuately displaced from said connecting means and operable in response to the sensing by the first detector station for displacing one or more pins in said first member into the path of travel of said third member, the rate of each of said members being proportional to the rate of the conveyed workpiece and in the same ratio thereto as a fixed arcuate distance is to the distance between said detector stations, and means operable in response to the meeting of the first of said displaced pins and said third member for actuating the work treating means whereby when said first pin and third member meet the machine is operated in proper time relationship to the passage of the midportion of the workpiece through the machine.

19. In a work treating machine having work treating means and conveyor means, a control system comprising first and second detector stations spaced apart along said conveyor means, said stations being positioned so that a conveyed workpiece first passes by the first station, said first station including means for sensing only the passage of the trailing edge of the conveyed workpiece independently of said second station and said second station including means for sensing only the passage of the leading edge of said workpiece independently of said first station, and a control mechanism comprising two coaxial members rotating in opposite directions at constant rates of speed, a multiplicity of pins annularly arranged in the first rotating member in displaceable relation thereto, a third coaxial member arranged to be intermittently connected with the second rotating member, means operable in response to the sensing by said second detector station for causing said third member to be so connected and driven by said second rotating member, means arcuately displaced from said connected means and operable in response to the sensing by the first detector station for displacing one or more pins in said first rotating member into the path of travel of said third member, and means for varying the arcuate displacement between said connecting means and displacing means, the rate of said first member being proportional to the rate of the conveyed workpiece and in the same ratio thereto as a fixed arcuate distance is to the distance between said detector stations, and means operable in response to the meeting of the first of said pins and said third member for actuating the work treating means whereby when said first pin and third member meet the work treating means are actuated in proper time relationship to the passage of a selected intermediate portion of the workpiece through the machine.

20. In a work treating machine having work treating means, electrically actuated means for operating the work treating means, and conveyor means, a control system comprising first and second detector stations spaced apart along said conveyor means, said stations being positioned so that a conveyed workpiece first passes by the first station, said first station including means for sensing only the passage of the trailing edge of the conveyed workpiece independently of said second station and said second station including means for sensing only the passage of the leading edge of the workpiece independently of said first station, and a control mechanism comprising two coaxial members rotating in opposite directions at constant rates of speed, a multiplicity of pins annularly arranged in the first rotating member in displaceable relation thereto, a third coaxial member arranged to be intermittently connected with the second rotating member, means operable in response to the sensing by said second detector station for causing said third member to be so connected and driven by said second rotating member, means arcuately displaced from said connecting means for displacing one or more pins in said first rotating member into the path of travel of said third member, the rate of said first member being proportional to the rate of the conveyed workpiece and in the same ratio thereto as a fixed arcuate distance is to the distance between said detector stations, and a switch attached to said third member which is adapted to be closed upon the meeting of the first of said displaced pins and said third member, said switch thereby completing the electrical circuit controlling the work treating operating means whereby when said first pin and said third member meet the work treating means are actuated in proper time relationship to the passage of a selected intermediate portion of the workpiece through the machine.

21. In a work treating machine having conveyor means, first and second detector stations for respectively sensing the passage of the trailing and leading edges of a conveyed workpiece, said stations being located so that the leading edge of the workpiece first passes beyond the first detector station, an operating point beyond said first detector station, and control means responsive to the sensings by said stations for determining the arrival at said point of a selected intermediate portion of any length workpiece which is no longer than $$\frac{D}{E}$$

in which $D=$ the distance between the first detector station and said operating point, and $E=$ the selected fractional portion of the workpiece.

22. A work treating machine having conveyor means and work treating means in which is provided a control system for actuating said work treating means in timed relation to the passage of a selected intermediate portion of a conveyed workpiece, said system comprising first and second detector stations for respectively sensing the passage of the trailing and leading edges of the conveyed workpiece, said stations being located so that the leading edge of the workpiece first passes beyond the first detector station, said work treating means also being located beyond said first detector station, and a control means responsive to the sensings by said stations for actuating said work treating means upon the arrival at a predetermined operating point with respect to said work treating means of a selected intermediate portion of any length workpiece which is no longer than $$\frac{D}{E}$$

in which $D=$ the distance between the first detector station and the operating point, and $E=$ the selected fractional portion of the workpiece.

23. A work treating machine having conveyor means and work treating means, in which is provided a control system for actuating said work treating means in timed relationship to the passage of a selected intermediate portion of a conveyed workpiece, said system comprising first and second detector stations for respectively sensing the passage of the leading and trailing edges of the conveyed workpiece, said stations being located so that the leading edge of the workpiece first passes beyond the first detector station, said work treating means also being located at a point beyond said first detector station, and control means having at least one control element responsive to the sensing by said second station and a plurality of control elements responsive to the sensing by said first detector station thereby enabling more than one workpiece at a time to be registered by said control means whereby the minimum spacing between workpieces is greatly reduced.

24. A work treating machine having conveyor means and work treating means and a control system for actuating said work treating means in timed relationship to the passage of a selected intermediate portion of a conveyed workpiece, said system comprising first and second detector stations for selectively sensing the passage of the leading and trailing edges of the conveyed workpiece, said stations being located so that the leading edge of the workpiece first passes beyond the first detector station, said work treating means also being located at a point beyond said first detector station, and a control mechanism having first and second elements arranged to be moved toward each other at constant rates which are independently actuated in response to the sensings of said first and second detector stations respectively, the rate of said first element being proportional to the rate of the conveyed workpiece and in the same ratio thereto as a fixed distance is to the distance between said stations whereby when the distance between said elements has been exhausted a selected intermediate portion of a workpiece has arrived at a predetermined point in relation to said work treating means, and means responsive to the exhaustion of said distance for actuating said work treating means.

25. A work treating machine having conveyor means and work treating means and a control system for actuating said work treating means in timed relationship to the passage of a selected intermediate portion of a conveyed workpiece, said system comprising first and second detector stations for selectively sensing the passage of the leading and trailing edges of the conveyed workpiece, said stations being located so that the leading edge of the workpiece first passes beyond the first detector station, said work treating means also being located at a point beyond said first detector station, and a control mechanism having first and second means for varying a condition at constant rates which are independently actuated in response to the sensing by the first and second detector stations respectively, the rate of variation caused by said first means being proportional to the rate of the conveyed workpiece and in the same ratio thereto as a fixed amount of said condition is to the distance between said stations, adjustable means for altering the value of said condition whereby when said condition has been varied by either or both means to a predetermined value, a selected intermediate portion of the workpiece has arrived at a predetermined point in relation to said machine, and means responsive to the variation of said condition to said predetermined value for actuating said work treating means.

26. A work treating machine having conveyor means and work treating means and a control system for actuating said work treating means in timed relationship to the passage of a selected intermediate portion of a conveyed workpiece, said system comprising first and second detector stations for selectively sensing the passage of the leading and trailing edges of the conveyed workpiece, said stations being located so that the leading edge of the workpiece first passes beyond the first detector station, said work treating means also being located at a point beyond said first detector station, and a control mechanism having two members moving in opposite directions at constant rates, one of said members having a multiplicity of displaceable elements, an indicating element which may be intermittently attached to the other of said elements, means operable in response to the sensing by one of said stations for attaching said indicating element to said other member, means spaced apart from said attaching means which are operable in response to the sensing by the other of said stations for causing at least one of said displaced elements to be disposed in a path interfering with that of said indicating element and moving theretowards, the rate of one of said members being proportional to the rate of the conveyed workpiece and in the same ratio thereto as a fixed distance is to the distance between said stations whereby when the distance between the two actuating means is exhausted by the displaceable element meeting the indicating element a selected intermediate portion of the workpiece has arrived at a predetermined point in relation to said machine, and means responsive to the meeting of said indicating element and said displaceable element for actuating said work treating means.

27. A work treating machine having conveyor means and work treating means and a control system for actuating said work treating means in timed relationship to the passage of a selected intermediate portion of a conveyed workpiece, said system comprising first and second detector stations for selectively sensing the passage of the leading and trailing edges of the conveyed workpiece, said stations being located so that the leading edge of the workpiece first passes beyond the first detector station, said work treating means also being located at a point beyond said first detector station, and a control mechanism comprising first and second coaxial members rotating in opposite directions, a multiplicity of pins annularly arranged in the first rotating member in displaceable relation thereto, a third member arranged to be intermittently connected with the second rotating member, means operable in response to the sensing by the second detector station for causing said third member to be so connected and driven by said second rotating member, means arcuately displaced from said connecting means and operable in response to the sensing by the first detector station for displacing one or more pins in said first member into the path of travel of said first member, the rate of said first member being proportional to the rate of the conveyed workpiece and in the same ratio thereto as a fixed arcuate distance is to the distance between said detector stations whereby when the first of said displaced pins meets said third member a selected intermediate portion of a workpiece is at a predetermined point in relation to the machine, and means responsive to the meeting of said first displaced pin and said third member for actuating said work treating means.

28. A work treating machine having conveyor means and work treating means and a control system for actuating said work treating means in timed relationship to the passage of a selected intermediate portion of a conveyed workpiece, said system comprising first and second detector stations for selectively sensing the passage of the leading and trailing edges of the conveyed workpiece, said stations being located so that the leading edge of the workpiece first passes beyond the first detector station, said work treating means also being located at a point beyond said first detector station, and a control mechanism comprising two coaxial members rotating in opposite directions at constant rates of speed, a multiplicity of pins annularly arranged in the first rotating member in displaceable relation thereto, a third coaxial member arranged to be intermittently connected with the second rotating member, means operable in response to the sensing by said second detector station for causing said third member to be so connected and driven by said second rotating member, means arcuately displaced from said connected means and operable in response to the sensing by the first detector station for displacing one or more pins in said first rotating member into the path of travel of said third member, the rate of said first member being proportional to the rate of the conveyed workpiece and in the same ratio thereto as a fixed arcuate distance is to the distance between said detector stations whereby when the first of said pins and said third member meet a selected intermediate portion of the workpiece is in a predetermined relation to the machine, means responsive to the meeting of said first pin and third member for actuating said work treating means, yieldable means operable in response to engagement of the third coaxial member and a displaced pin for disengaging said third member from said second member and returning it to its start position, and camming means integral with said third member which are arranged to erase or return said displaced pins to their original position during the disengaging motion or during the returning motion of the third member whereby said third member can again be set in motion prior to the time said displaced pin would have reached the starting point of said third member thereby permitting more than one sensing of a trailing edge by the lower station to be represented by displaced pins at the same time.

References Cited in the file of this patent

UNITED STATES PATENTS

| | | |
|---|---|---|
| 955,221 | Stilwell | Apr. 19, 1910 |
| 2,034,040 | Johnson | Mar. 17, 1936 |
| 2,374,779 | Preston | May 1, 1945 |